United States Patent [19]

Ellersick

[11] 3,731,051
[45] May 1, 1973

[54] ARTICULATED RADIANT HEATING MODULES

[76] Inventor: Russell R. Ellersick, 7925 Twin Oak Avenue, Citrus Heights, Calif. 95610

[22] Filed: Mar. 26, 1971

[21] Appl. No.: 128,459

[52] U.S. Cl. ................... 219/162, 219/347, 219/351
[51] Int. Cl. .............................................. C21d 1/40
[58] Field of Search ..................... 219/354, 535, 347, 219/348, 351, 162, 137; 29/487, 497

[56] References Cited

UNITED STATES PATENTS

| 3,353,005 | 11/1967 | Sisson et al. | 219/411 |
| 2,418,283 | 4/1947 | Wilson | 219/348 |
| 2,809,265 | 10/1957 | Jackson | 219/525 |
| 3,114,822 | 12/1963 | Boland | 219/395 |
| 2,610,280 | 9/1952 | Wilson | 219/348 |
| 2,478,001 | 8/1949 | Miskella | 219/354 |
| 3,444,357 | 5/1969 | Drugmand | 219/535 |
| 1,406,360 | 2/1922 | Forshee | 219/526 |
| 2,668,896 | 2/1954 | Husaczka et al. | 219/535 |
| 3,240,915 | 3/1966 | Carter et al. | 219/351 |

Primary Examiner—J. V. Truhe
Assistant Examiner—George A. Montanye
Attorney—Cushman, Darby & Cushman

[57] ABSTRACT

Apparatus for stress relieving a welded joint between two large diameter pipes comprises a plurality of electric heater modules hinged end-to-end so as to fit chain-like around the circumference of the pipe. Each heater module comprises several quartz bulbs projecting from an air-cooled housing in which the bases of the bulbs are supported, and a reflector to direct heat from the bulbs toward the pipe.

1 Claim, 5 Drawing Figures

Patented May 1, 1973
3,731,051
2 Sheets-Sheet 1
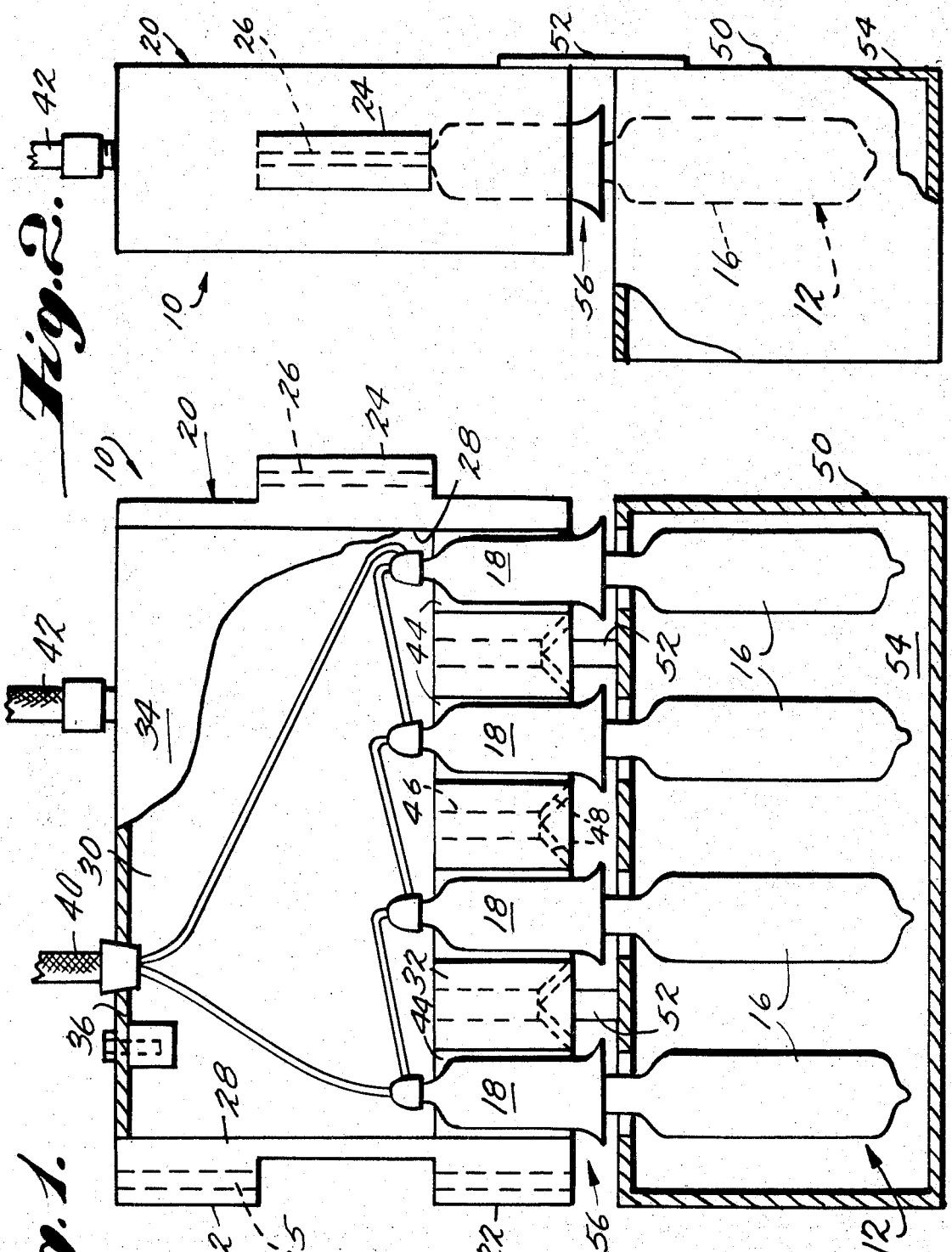
INVENTOR
RUSSELL R. ELLERSICK
BY Cushman, Darby & Cushman
ATTORNEYS Patented May 1, 1973

INVENTOR
RUSSELL R. ELLERSICK

BY Cushman, Darby & Cushman
ATTORNEYS

ARTICULATED RADIANT HEATING MODULES

This invention relates to electrical heating apparatus and in particular to apparatus for applying radiant heat uniformly to any of a variety of differently contoured workpieces, such as the circumferences of large pipes for the purpose of relieving weld stresses in the pipe walls.

The uniform intense heating of a preselected portion of a large workpiece by known techniques presents several difficulties in that the apparatus may be massive and non-portable, the apparatus may be contoured to heat only a single shape and size of workpiece, the available temperatures may be limited to about 1500° F, hot spots and other non-uniform heating effects may occur, and the entire assembly may become heated. All of these difficulties may be visualized readily by contemplating, for example, the thermal stress relieving at 1300° F of a welded joint between the abutting ends of two large pipes having, say, 6 foot diameters and wall thicknesses of 5 inches. Since rate of temperature rise and uniformity of temperature at all circumferential points must be closely controlled it is apparent that the size and mass of such a workpiece presents significant heat control problems.

The heating apparatus and method of the present invention overcome the above disadvantages to a large degree as a result of the use of special modular heat-generating units linked together to form a chain-like assembly. The assembly can be made up of the appropriate number of modules at the site and then conformed to the contour of the workpiece, as by being wrapped about the circumference of a pipe to be heated. Each module contains a radiant heating means, preferably in the form of a group of quartz iodide lamps capable of emitting high intensity radiant heat in a range of wave lengths near infra-red but sufficiently outside the latter that the escaping light rays are not harmful to the eyes. It has been found that this type of radiant heat can be rather easily controlled to give substantially more rapid heat penetration into the workpiece and greater uniformity of temperature within the workpiece than can be obtained with, for example, a resistance heater disposed in the same relative position.

The invention will be further understood from the following detailed description taken with the drawings in which:

FIG. 1 is an elevational view, partly broken away, of a heat-generating module embodying the principles of the present invention;

FIG. 2 is a side view of the module of FIG. 1;

Figure 3:
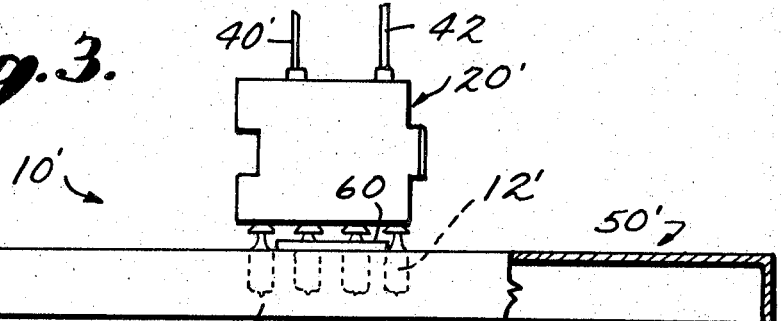
FIG. 3 is an elevational view of a modified heat-generating module.

Referring to FIG. 1 there is shown a heat-generating module 10 which includes a plurality of heating elements in the form of four quartz iodide lamps 12 having base portions and elongated bulb portions 16. The lamps 12 are arranged parallel to each other in a common plane with their base portions supported by sockets 18 located within a housing 20 and the bulb portions 16 extending from the housing 20.

The housing 20 may be of rectangular box-like construction and is provided at each end with one-half of an articulated connection so that each end of the housing 20 can be pivotally attached to one end of an identical heat-generating module. In the illustrated embodiment the one-half articulated connections are constructed integrally with the housing 20, as by casting the housing 20 with integral complementary hinge-type projections 22,24 at each end and then drilling hinge-pin holes 26 through the projections parallel to the longitudinal axis of the lamps 12.

Referring more specifically to the housing 20 it will be seen that in the illustrated embodiment the end walls 28, rear wall 30 and bottom wall 32, which may be integral with each other, together with a front wall 34 and removable top wall 36, form a chamber 38 which contains the electrical connections for the lamps 12. Current for the lamps 12, which are connected in series, is supplied through an electrical conduit 40 passing through the top wall 36.

The chamber 38 also forms a plenum for receiving a supply of pressurized cooling air which is required for maintaining the temperature of the sockets 18 and lamp base portions sufficiently low to prevent damage thereto. Air is supplied to the chamber 38 through a flexible tube 42 and flows downwardly through an annular space 44 between each socket 18 and the bottom wall 32 of the housing 20. The bottom wall 32, which is of thick construction so as to absorb heat, is provided with a plurality of cooling passages 46 passing downwardly therethrough and having branched ends 48 for supplying additional cooling air to the lower ends of the sockets 18.

The heating module 10 also includes a radiant heat reflector which may be of several different shapes. The reflector 50 illustrated in FIGS. 1 and 2 is of rectangular box-like shape having an open front so that heat from the lamps 12 is reflected out of the module 10 in a direction transverse to the hinge-pin holes 26 or equivalent articulation axes. The reflector 50 is supported by the housing, as by means of straps 52 attached between the rear wall 30 of the housing 20 and the rear wall 54 of the reflector 50. A space 56 is intentionally provided between the bottom of the housing 20 and the top of the reflector 50 to permit escape of cooling air in a lateral direction.

The inner surfaces of the reflector 50 are coated with a layer of reflective, heat-resistant, insulating material which protects the reflector from overheating and reflects most of the radiant energy.

Figure 4:
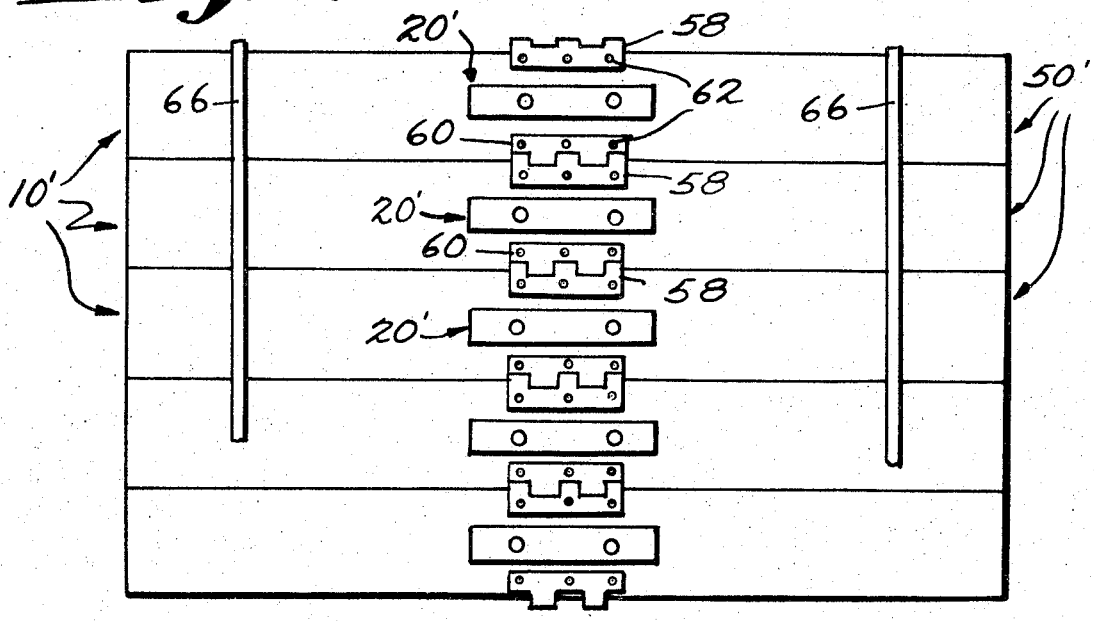
FIG. 4 is a plan view of an assembly of modules of the type illustrated in FIG. 3.

A modification embodying a different relationship between housing and reflector is illustrated in FIGS. 3 and 4. In this construction the reflector 50' is of box-like construction open at the bottom, and the means for articulating the module 10' are provided at the edges of the reflector 50'. As shown, the articulation means are opposite halves 58,60 of a hinge attached to opposite edges of the upper wall as by means of screws 62.

The housing 20' and lamp arrangement shown in FIGS. 3 and 4 may be the same as shown in FIGS. 1 and 2. However, it will be noted that the housing 20' is rigidly mounted on top of the upper wall of the reflector 50' and that the reflector 50' is of considerably greater length than the housing 20'. The axes of articulation in this embodiment extend transversely to the longitudinal axes of the lamps 12'.

The construction of the iodine quartz tungsten filament lamps 12 forms no part of the present invention. However, these lamps which are available commercially are preferred in the present invention because of their ability to achieve high operating temperatures (about 2100° F) without the danger of eye damage which is present with conventional high intensity infrared heat sources. This latter feature is significant, because no precautions are necessary to prevent incidental light from escaping to the surrounding area during use.

Referring now to the manner of using the modules 10 and 10' it will be apparent from the previous description that the principle utility of the modules lies in connecting together an appropriate number of modules and then conforming the shape of the resulting flexible assembly to the workpiece to be heated. Thus, considering again the example of stress relieving a welded joint between the ends of two large-diameter pipes it will be understood that two of the steps in the technique involve assembling a chain of modules of sufficient length to circumscribe the weld area and mounting the assembly to the wall of the pipe in such a position that all the reflectors 50 or 50' face inwardly toward the pipe.

All of the lamps 12 or 12' should be disposed the same distance from the weld area in order to obtain uniform heating, and this is automatically accomplished when the edges of the openings in the reflectors 50 or 50' are placed in engagement with the pipe wall, because the walls of the reflectors serve as spacers. Contact between the workpiece and the lamps must be avoided because the lamps are fragile and easily broken. The assembly of modules may be held in place with a band which is tightened and clinched in place in the same manner as a box or crate is banded for shipment. Conveniently the band directly engages all outermost wall of the series of reflectors 50 or 50'.

When the assembly of modules 10 or 10' contains a large number of modules it is preferred to control the supply of electric current to banks of modules rather than to all the modules simultaneously. For example, if 64 modules are required to circumscribe a pipe, eight banks of 8 modules can be separately controlled in accordance with temperature measurements made at spaced points on the pipe wall either inside or outside the pipe or both.

Figure 5:
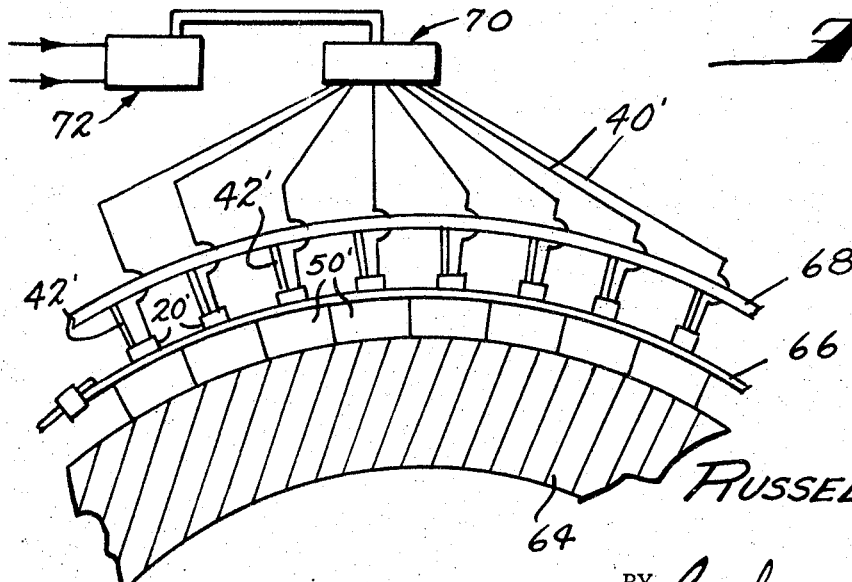
FIG. 5 is a view of an assembly of modules of the type illustrated in FIGS. 1, 2 and 3.

FIG. 5 illustrates schematically one manner of using an assembly of modules 10' in surrounding relation to the wall of a large-diameter, thick-walled pipe 64. Each module 10' is hinged to each of its neighbors as illustrated in FIG. 4, and the entire chain-like assembly is held in contact with the wall by one or more metal bands 66 tightened around the reflectors 50'. If desired, insulation such as fiber glass may be provided between the pipe wall and the edges of the reflectors 50'. A compressed air manifold 68 is supported outwardly of the modules 10' for providing cooling air to each of the air tubes 42'.

An electrical junction box 70 and power controller 72 (volts and amperes) are provided for any multiple of electrical leads 40'. In order to provide a basis for the control of the electrical input to each controller 72 thermocouples (not shown) may first have been welded to the pipe 64 at various points inside and outside. The junctions of the outside thermocouples must be covered with a refractory cement to prevent the thermocouple from measuring lamp temperature rather than pipe temperature. Preferably at least some of the thermocouples are located on opposite sides of the pipe wall on the same pipe radius. An exemplary stress relieving operation includes the following steps;

a. Heat pipe to about 600°F in one hour
b. Increase power to increase pipe temperature to about 1160° F at the rate of 400° F per hour
c. Hold pipe temperature at about 1160° F for one hour for each inch of pipe wall thickness
d. Reduce power to reduce pipe temperature to about 600° F at the rate of 400° F per hour
e. Shut off power at 600° F and maintain air flow until the equipment is cool It will be apparent that the linked-module concept is not limited to cylindrical workpieces and has utility in connection with a wide variety of shapes, including flat elongated workpieces. The principal advantage of the technique is that the heating apparatus is readily portable and is readily adapted to a variety of sizes and shapes of workpieces, because the modules are connected together at the site to fit the particular workpiece.

What is claimed is:

1. An apparatus for stress relieving welded joints comprising a plurality of heat-generating modules each having one-half of a hinge connection rigidly attached at each of two substantially parallel side edges and hinge-connecting each adjacent module, each of said modules comprising: a housing having a plurality of parallel apertures extending through a wall thereof, each of said apertures surrounding a socket for a quartz lamp and defining with the respective socket an annular space which communicates with the interior of said housing; a quartz lamp retained in each of said sockets and having a bulb portion extending axially of the respective aperture to a position outside said housing; electrical connections within said housing connecting the sockets in series; electrical leads passing through another wall of the housing and electrically connected to said connectors for supplying current to the series-connected sockets; a cooling air inlet for supplying a stream of cooling air to the interior of said housing whereby cooling air flows out of said housing through said annular spaces; an elongate reflector housing spaced from said apertured wall and supported by said housing, said reflector housing surrounding the bulb portions of said quartz lamps on all sides and having an opening facing axially of said bulb portions said reflector housing having a reflective surface over an internal surface of said reflector housing, said reflector housing forming said two substantially parallel side edges, said opening having a circumscribing edge lying substantially in a single plane so as to be engageable with a workpiece.

* * * * *